Figure 1:
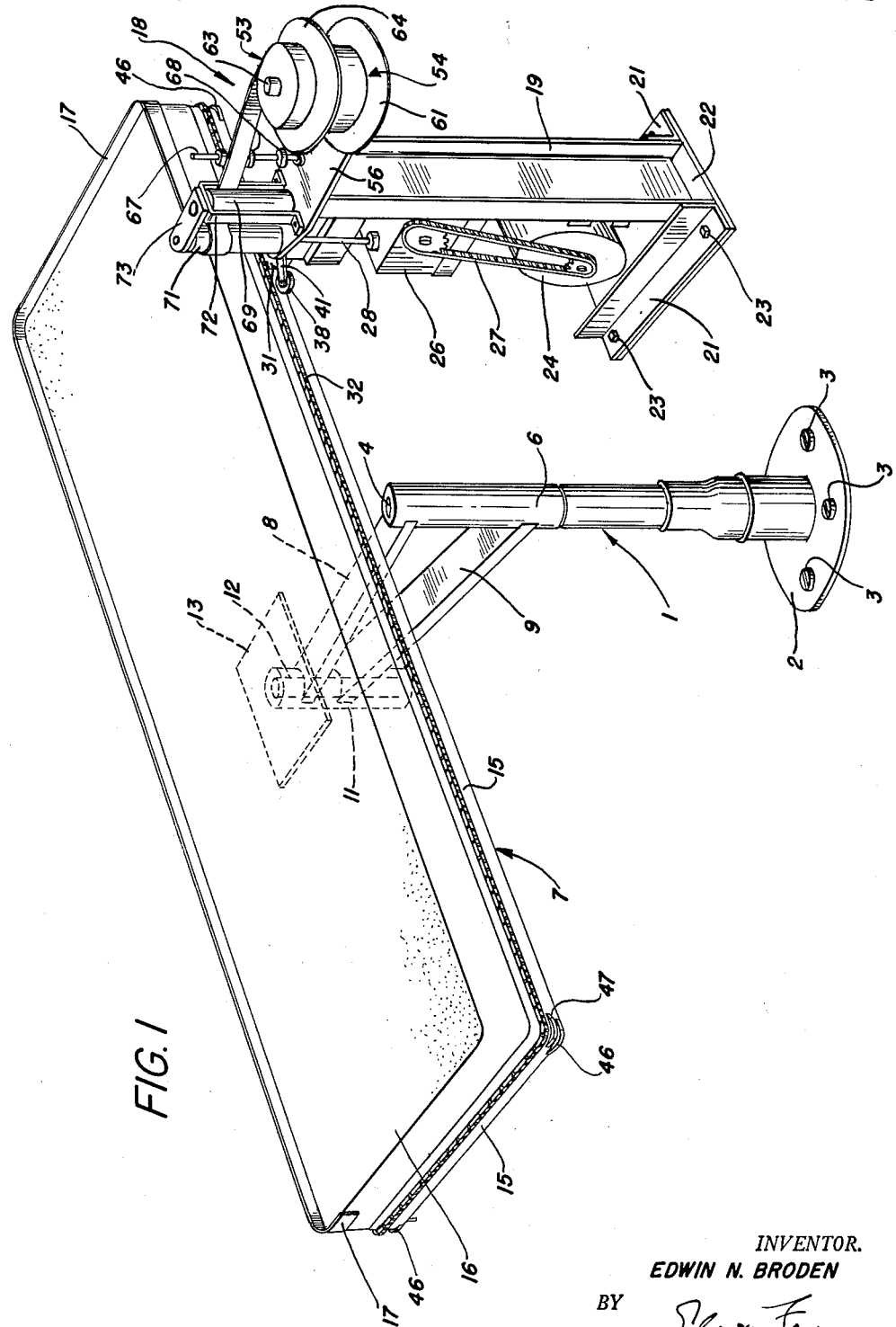

July 19, 1955 E. N. BRODEN 2,713,437
MACHINE FOR OPERATING ON PERIPHERIES OF NON-CIRCULAR OBJECTS
Filed Nov. 19, 1951 5 Sheets-Sheet 2

INVENTOR.
EDWIN N. BRODEN
BY
ATTORNEYS

July 19, 1955 E. N. BRODEN 2,713,437
MACHINE FOR OPERATING ON PERIPHERIES OF NON-CIRCULAR OBJECTS
Filed Nov. 19, 1951 5 Sheets-Sheet 3

INVENTOR.
EDWIN N. BRODEN
BY
ATTORNEYS

July 19, 1955 E. N. BRODEN 2,713,437
MACHINE FOR OPERATING ON PERIPHERIES OF NON-CIRCULAR OBJECTS
Filed Nov. 19, 1951 5 Sheets-Sheet 4

INVENTOR.
EDWIN N. BRODEN
BY
ATTORNEYS

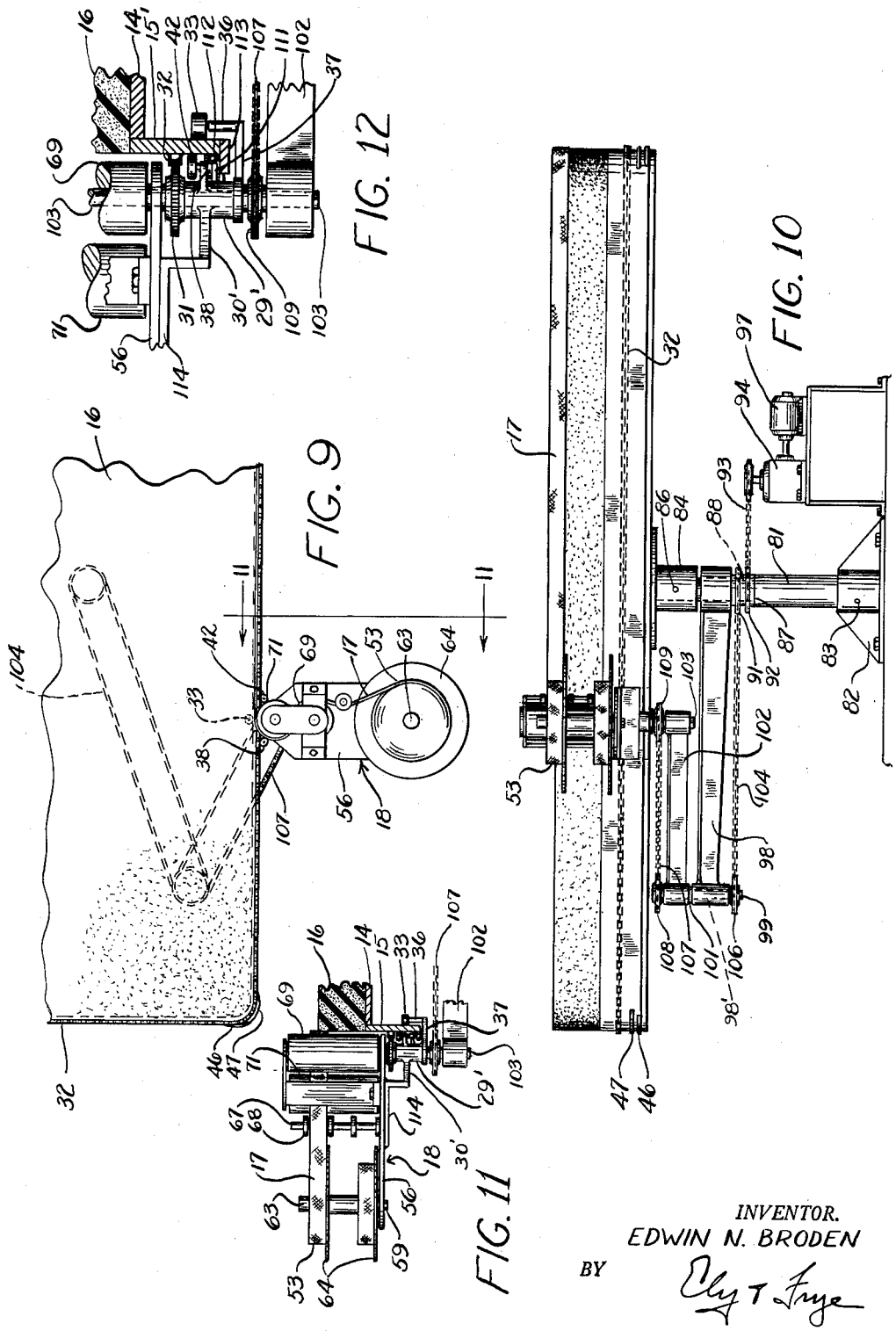

United States Patent Office 2,713,437
Patented July 19, 1955

2,713,437

MACHINE FOR OPERATING ON PERIPHERIES OF NON-CIRCULAR OBJECTS

Edwin N. Broden, Assonet, Mass., assignor to The Firestone Tire & Rubber Company, Akron, Ohio, a corporation of Ohio Application November 19, 1951, Serial No. 257,125

18 Claims. (Cl. 216—20)

The immediate object of the present invention is to provide a machine for applying strips of adhesive tape to the upper and lower edges of a sponge rubber mattress, but features of the invention may be adapted to other purposes, and hence the invention is not limited to that particular operation.

Mattresses are generally rectangular, with rounded corners, and the chief difficulty in applying the tape by machine methods has to do with the problem of negotiating the corners of the mattress. A related problem arises from the fact that the points of application of the tape are at a constantly varying radial distance from the center of the mattress. According to the invention, a dispensing station is provided for cooperation with a mattress-holding table of size and shape similar to the mattress. The table and dispensing station have co-operating drive elements which cause relative movement between the two, so that the entire periphery of the table is encompassed by the dispensing station. The problem of varying radial distance of the table periphery is dealt with by a system of compound rotary motion wherein either the table or the dispensing station is mounted for swing about a pair of spaced, parallel, vertical axes. This type of motion requires that the dispensing station and the table be interengaged in such manner that the table is held to the dispensing station. This is accomplished by means of a roller engaging the inside of a skirt depending from the table and a pair of rollers engaging the outside of the skirt. This system, which holds the table in contact with the dispensing station, and also keeps the drive wheel on the station properly aligned, presents no difficulty on the straight portions of the table. However, it is not adapted to maintain the grip on the table when moving around the corners, with the result that the drive means would tend to jam. Such malfunctioning is avoided by providing auxiliary tracks on the corners of the table for the outer rollers, which ensure contact of all three rollers and maintain the supporting means for the drive wheel properly oriented with respect to a tangent to the curved surface of the skirt at the corners.

Figure 2:
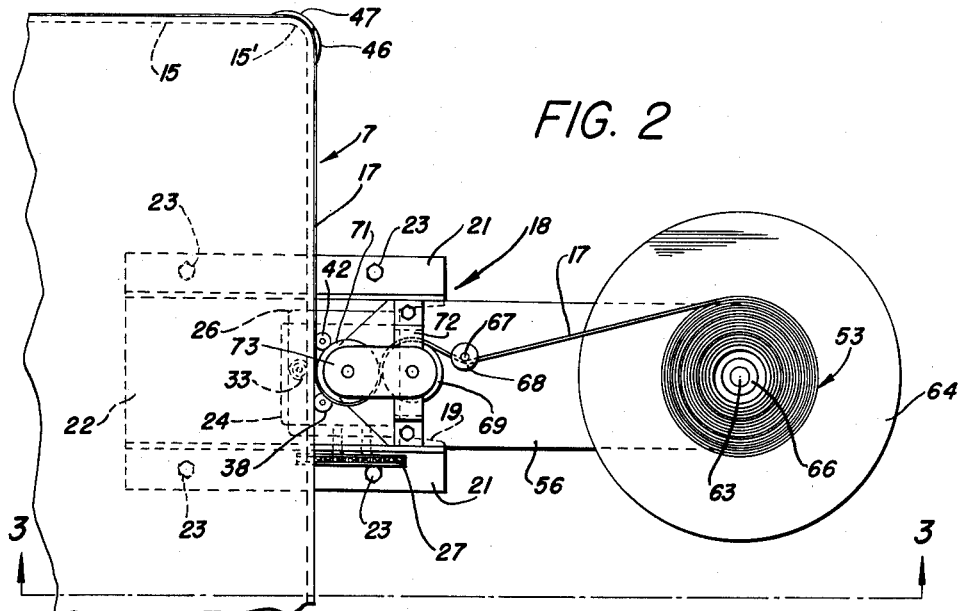
Figures 4, 5:
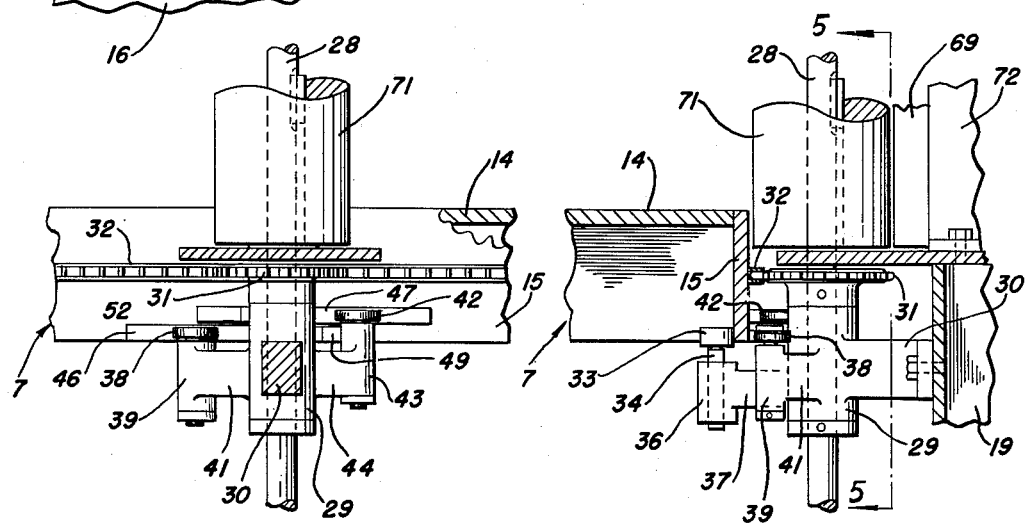
Figure 3:
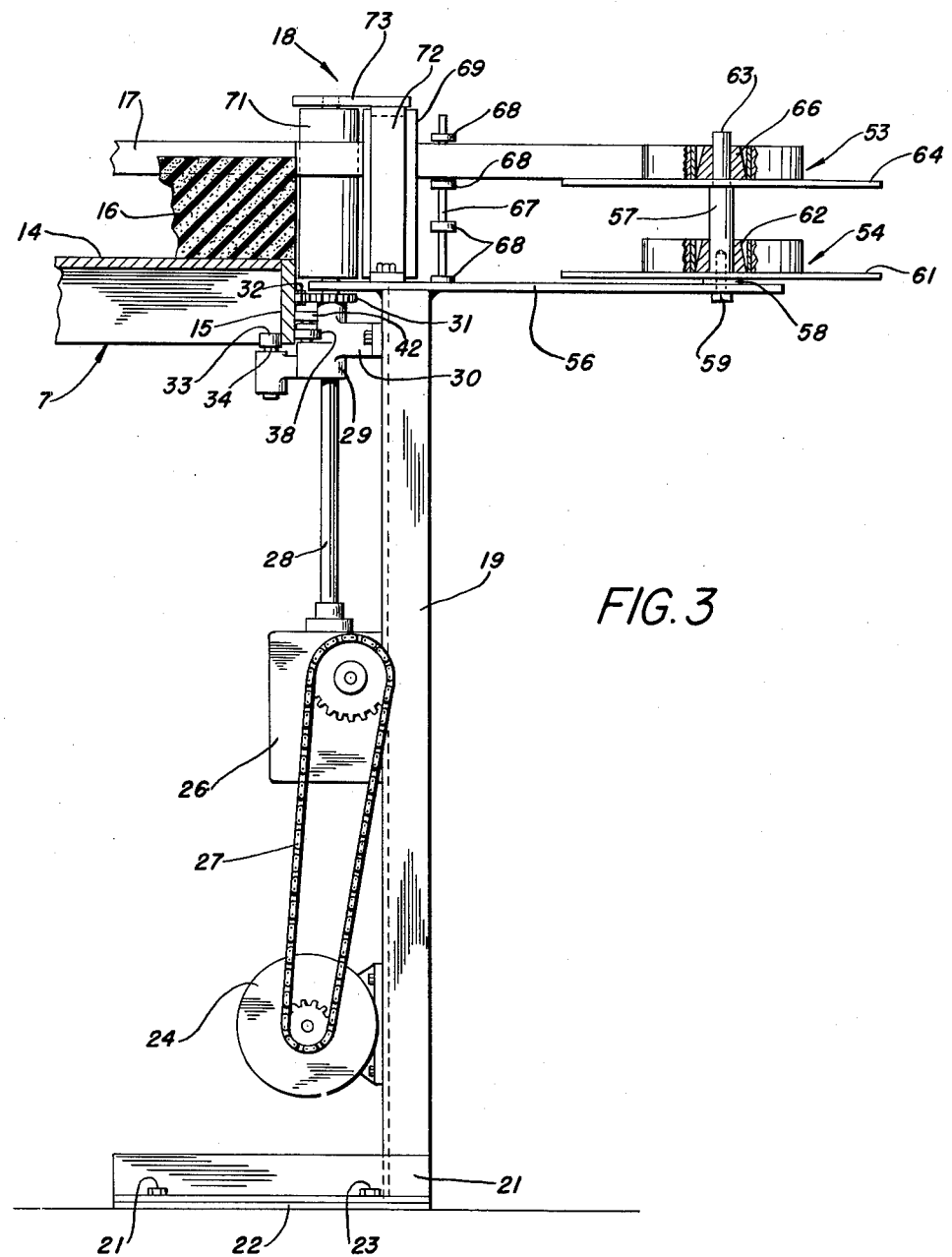

In the drawings:

Fig. 1 is a perspective view of a mattress support, holding a mattress, and a fixed, tape-applying machine having a driving connection with the support, Fig. 2 is a top plan view of the tape-applying machine of Fig. 1, and an adjacent portion of the mattress and support, Fig. 3 is a sectional view, taken on the line 3—3 of Fig. 2, Fig. 4 is an enlarged detail of certain parts shown in Fig. 3, showing the driving connection with the mattress support, and with a corner of the latter at the driving connection, Fig. 5 is a sectional view taken on the line 5—5 of Fig. 4, Figs. 6, 7, and 8 are bottom plan views of the elements shown in Fig. 5, illustrating positions of the table and the table guiding means at three stages of advance in negotiation of a corner region of the mattress-supporting table, Fig. 9 is a top plan view of a modification, showing a stationary table, and a tape dispenser which moves around the periphery of the table, Fig. 10 is an elevational view of Fig. 9, Fig. 11 is a sectional view taken along the line 11—11 of Fig. 9, and Fig. 12 is an enlarged view of a part of Fig. 11.

Referring to the form of the invention shown in Figs. 1 to 8, there is shown a standard 1 having a base plate 2 secured to a floor, as by screws 3, and having a reduced, upper end 4 providing a shaft for journaled support for a hub 6. The latter constitutes a support for a mattress-holding table 7 and comprises a crank arrangement having an upper, horizontal arm 8 and a lower strut 9, inclined to the horizontal. Carried on the outer ends of arms 8 and 9 is a cylindrical housing 11 in which is journaled a pin 12, secured to and depending from a plate 13 screwed to the underside of table 7 at the center thereof. It will be seen that table 7 thus may partake of two distinct modes of motion: One of rotation about the pin 12 and another of revolution of its center about the axis of shaft 4. As will be seen, it is the composite or resultant of these types of motion which enables passing the entire periphery of the table past a fixed point.

Table 7 has the same form as the mattress to be taped and includes a plane, top surface 14 with a guiding flange in the form of a dependent skirt 15 around its entire periphery for a purpose presently to be explained. The mattress, which is indicated at 16, is of the foamed latex type, around the corner edges of which are placed strips of adhesive tape 17, to which the top and bottom and the side covers of the mattress are to be attached.

Tape 17 is applied automatically by the machinery indicated as a whole by the numeral 18. The latter, which is shown in detail in Figs. 2 to 8, is mounted on an upright channel 19 secured to a pair of angle bars 21 forming part of a base which includes a plate 22 and is secured to the floor by screws 23. A motor 24 and a reduction gearing unit 26, interconnected through a drive chain 27, are mounted on the base or web of channel 19. From the reduction gearing unit a shaft 28 leads upward through a journal sleeve 29 having a bracket 30 bolted to channel 19, and keyed to the shaft above said sleeve is a sprocket 31 which engages an endless chain 32 secured to the outer face of skirt 15 about midway of the width thereof.

Chain 32 is held constantly in engagement with the sprocket 31 by means of rollers carried by sleeve 29 and engaged on inside and outside faces of the flange or skirt 15. Thus an inboard roller 33 is journaled on the reduced upper end of a pin 34 secured in a sleeve 36 located at the end of an arm 37 integral with sleeve 29. The outboard rollers are two in number and comprise a lower roller 38 journaled in a sleeve 39 carried by an arm 41 integral with sleeve 29, and located near the bottom edge of skirt 15, and an upper roller 42 journaled in a sleeve 43 carried on an arm 44, also integral with sleeve 29 but projecting in the opposite direction from the arm 41. The upper roller 42 is so located that its lower side is above the plane of the upper side of lower roller 38 for a purpose presently to be explained. The relative locations of the inboard roller and the outboard rollers is such that skirt portion 15 of the table is snugly received between them, as will be clear from Fig. 4. It should be borne in mind that the compounded motion of table 7 is controlled in part by the three rollers 33, 38, and 42, the function of which is to keep the table so orientated at any given moment that its surface is tangent to driving sprocket 31; otherwise, jamming will occur. This condition is easily realized when the table-positioning rollers are engaging a straight section of the skirt portion. However, when a corner of the table reaches the drive sprocket, such as portion 15' in Fig. 6, the three rollers cannot contact the skirt simultaneously, and in such case serious jamming would occur. This condition is compensated for by providing track portions for the outer rollers, which extend from the outer face of the skirt portion at and near portion 15', the track portions being so arranged that the three rollers maintain simultaneous contact with the table skirt in negotiating a corner thereof.

These track portions, which may be referred to as cams, are best observed in Figs. 5 to 8. The track portions which are identical in shape but arranged in opposite senses, comprise a lower cam 46 on a level to engage lower roller 38 and an upper cam 47 on a level to engage upper roller 42. Lower cam 46 has a portion 48 in the form of an arc of a circle, commencing at table skirt 15, and with center at C which is also the center of corner skirt portion 15'. Cam 46 also has a straight portion 49 aligned with the outer surface of the straightaway portion of skirt 15 and extending to the terminus of arc 48. Likewise, cam 47 has an arcuate portion 51, the center of which is also at point C, and a straight portion 52, so arranged that the latter is aligned with the portion of skirt 15 at right angles to and adjacent the side with which straight cam portion 49 is aligned.

Figure 6:
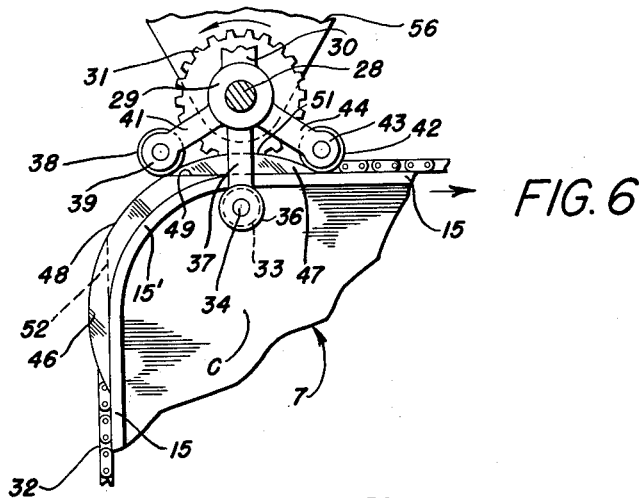
Figure 7:
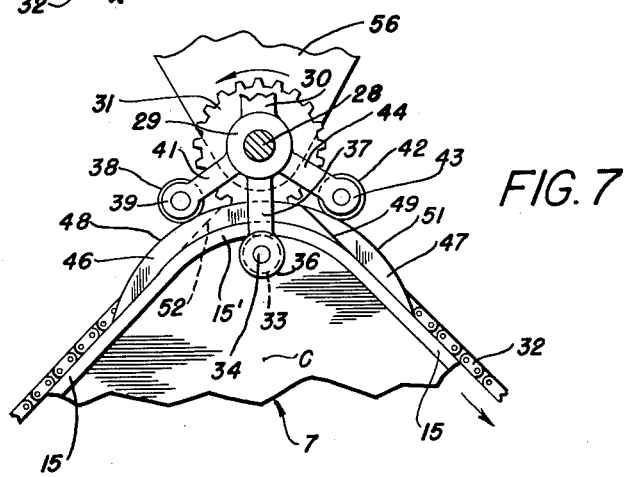
Figure 8:
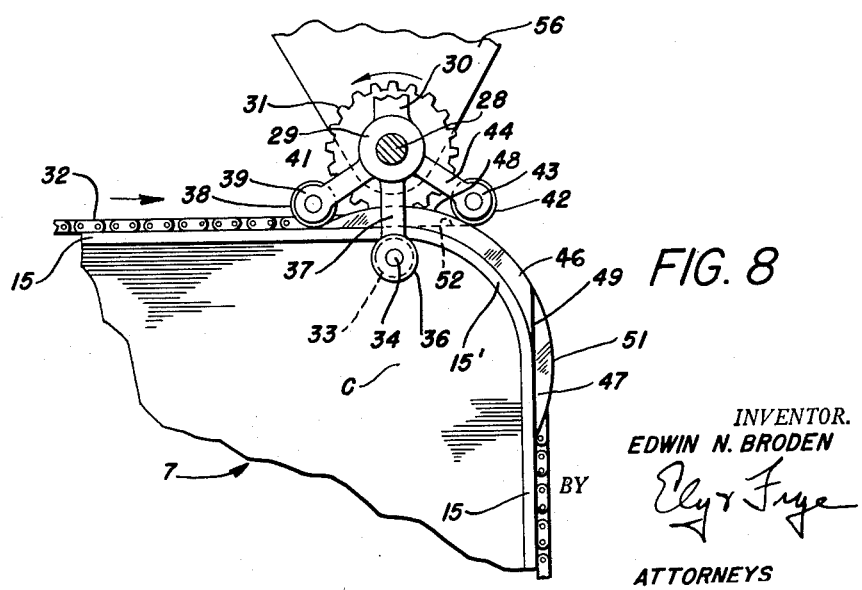

The action will be clear from Figs. 6, 7, and 8, in which the direction of progression of the table is shown by the arrows. In Fig. 6, leading roller 38 is beyond the normal terminus of the straight portion of skirt 15, but strict contact of all three rollers with the table is maintained due to the fact that roller 38 is riding on straight portion 49 of cam 46. When the end of straight portion 49 reaches roller 38 (Fig. 6), the latter commences to ride on arcuate part 48 of cam 46. However, at this stage, arcuate portion 51 of cam 47 has reached roller 42, and thereafter (Fig. 7) rollers 38 and 42 are in engagement with arcuate surfaces which are of equal radii and concentric with the inner surface of skirt portion 15'. This prevents binding between sprocket 31 and chain 32 and provides rigid control of the orientation of the system 18 with respect to the table equally as well as when the straightway portions of the skirt are engaged. During the entire time that the mechanism is negotiating the corner, the roller 33 is in contact with the inner surface of the skirt, and arm 37 is aligned with a radius of said surface. When the straight portion 52 of cam 47 reaches roller 42 (Fig. 8), the end of arcuate portion 48 of cam 46 has reached roller 38 and, thereafter, roller 38 engages the straight portion of skirt 15, and roller 43 engages the straight portion 52 of cam 47 until the straight skirt portion reaches roller 42, after which normal conditions obtain until the next corner of the skirt reaches the rollers.

In one cycle of the driving of the table, the latter rotates once in the journal 11, but the crank arms 8, 9 merely oscillate in compensating for the varying distances between the drive sprocket and the axis of pin 12.

The tape may be applied simultaneously to the top and bottom edges of the mattress and to this end provision is made for coaxially mounting a pair of reels of tape 53, 54 for free rotation. In the drawings, only the tape on reel 53 is being applied, the lower tape being omitted for the sake of more clearly showing the machine. The entire tape dispensing assembly is supported on a plate 56 suitably secured to the top of channel 19. A vertical spindle 57 has a collar 58 engaging the top of plate 56, to which it is secured by a bolt 59. Received on spindle 57 is a lower disc 61 having a hub 62 rotatable on spindle 57 and adapted to receive the spool of tape 54. Spindle 57 has a reduced upper end 63 providing a shoulder on which rests an upper disc 64 having a hub 66 rotatable on reduced end 63 and receiving tape spool 53.

The respective tapes pass around a guide rod 67, between pairs of guide collars 68, thence between a pair of vertical tensioning rollers 69, 71 and onto the mattress. Roller 69 is journaled in plate 56 and in the top of a U-strap 72 bolted to plate 56. Roller 71 is keyed to shaft 28 to be driven thereby and shaft 28 is journaled at its top in an arm 73 secured to the top of U-strap 72. The tape is thus dispensed by a power drive, and the radius of roller 71 is such that the rate of feed of the tape is the same as the rate at which table skirt 15 moves past the feed station.

In Figs. 9–12, there is shown a modified form of the invention wherein the tape dispensing station is arranged to move around the periphery of a stationary table. This is accomplished by a chain drive from the axis of a standard supporting the table, the drive being communicated through a "knee" linkage comprising a pair of radius arms serially arranged.

The table 7 is of the same general construction as the table of Fig. 1 and bears similar reference numerals for similar parts. However, in the modified form, the table is rigidly mounted on a central, cylindrical standard 81. The latter is seated in a flanged base 82, to which it is keyed by a pin 83, and attached to the underside of the table is a flange 84 received on standard 81, to which it is secured against rotation by a pin 86.

The upper end of standard 81 is of reduced diameter, defining a shoulder 87 on which rests a freely rotatable sleeve 88 having integral sprockets 91, 92. Sprocket 92 of sleeve 88 is turned by a chain 93 engaging a reduction gearing unit 94, which in turn is driven by a motor 97.

Rotatably mounted on standard 81, above sleeve 88, is a radius arm 98, in the outer end of which is journaled a pin 99 having a collar 101 intermediate its length which dwells on the top of a hub 98' on the end of arm 98. A second radius arm 102 has one end journaled on pin 99 above collar 101, and in its other end is journaled a shaft 103 which carries the sprocket 31 which engages chain 32 on the table, and is therefore equivalent to shaft 28 of the other modification in this respect. In addition to this function, shaft 103 carries the tape-dispensing apparatus.

Drive is communicated from sleeve 88 to shaft 103 by two chains, each coextensive with one of the radius arms, comprising a lower chain 104 engaging sprocket 91 and a sprocket 106 secured to the lower end of pin 99, and an upper chain 107 engaging a sprocket 108 secured to the upper end of pin 99, and a sprocket 109 secured to shaft 103. It should be noted that radius arms 98 and 102 are freely rotatable on shafts 81, 99 and 103, and are not swung by the chains 104 or 107 directly.

Sleeve 29' is generally similar to sleeve 29, but is somewhat longer than the latter, and carries an extra boss 111 journaling a roller 112 dwelling on a horizontal flange 113 carried by the lower edge of table apron 15', the latter being somewhat wider than apron 15 of Fig. 1 to accommodate the extra roller. The purpose of roller 112 is to relieve the radius arms from part of the load of the tape-carrying platform.

Most of the parts associated with the tape-dispensing station are the same as in the Fig. 1 modification and therefore bear the same reference characters as in that modification.

The platform 56 is supported against sagging by an angle bracket 114 secured to extension 30'.

As shaft 88 is turned, chains 104 and 107 communicate rotation to sprocket 31 and the latter advances along chain 32, carrying with it the tape-dispensing platform. The varying radial distances from shaft 103 to the axis of standard 81 are compensated for by "jacknifing" of the radius arms 98 and 102.

A great variety of lengths are possible for the radius arms, but their total length must exceed the distance from the center of the table to a corner thereof, to avoid dead-centering of the linkage.

The corners of the table are negotiated by means of cams 46, 47 and, as clearly seen in Figs. 9 and 12, the rollers 33, 38 and 42 cooperate with the table skirt 15', all in the same manner as in the Fig. 1 modification.

While certain preferred embodiments have been shown and described, the invention is not limited thereby since changes in the size, shape, character or arrangement, for instance, of the various parts may be resorted to without departing from the spirit or scope of the invention.

What is claimed is:

1. Apparatus for processing articles comprising a fixed processing unit having a drive means, supporting means for said articles of generally planar form with straight sides and rounded corners and having a peripheral skirt, said supporting means being mounted for complex movement about a plurality of axes normal to its plane, whereby said skirt portion may be driven by said drive means, a roller at said drive means adapted to contact the inside of said skirt, and a pair of rollers at said drive means adapted to contact the outside of said skirt on respective sides of the point of contact of the first-mentioned roller, said pair of rollers being located in separate planes parallel to the plane of said support, and cam means on said skirt at said corners arranged to maintain all three rollers in constant contact with said skirt, said cam means each comprising a straight portion aligned with a straight portion of said skirt, and an arcuate portion concentric with said skirt at said corner, and said respective cam means being arranged in opposite senses.

2. Apparatus for processing articles comprising a fixed processing unit having a drive means, supporting means for said articles of generally planar form with straight sides and rounded corners and having a peripheral skirt, said supporting means being mounted for complex movement about a plurality of axes normal to its plane, whereby said skirt portion may be driven by said drive means, a roller at said drive means adapted to contact the inside of said skirt, and a pair of rollers at said drive means adapted to contact the outside of said skirt on respective sides of the point of contact of the first-mentioned roller, said pair of rollers being located in separate planes parallel to the plane of said support, and cam means on said skirt at said corners arranged to maintain all three rollers in constant contact with said skirt.

3. Apparatus for processing articles comprising a fixed processing unit having a drive means, supporting means for said articles having a peripheral skirt portion in a form other than circular, said supporting means being mounted for complex movement whereby said skirt portion may be driven by said drive means, means to contact the inside and outside of said skirt portion adjacent said drive means and comprising an element on one side of said skirt portion and a pair of elements on the other side of said skirt portion, and track means extending from said skirt portion and adapted to engage said pair of elements in the portions of said skirt having a form other than rectilinear, whereby contact of all three elements with said skirt is maintained at all times, said pair of elements lying in different planes and said track means comprising a separate track for each of said pair of elements.

4. Apparatus for processing articles comprising a fixed processing unit having a drive means, supporting means for said articles having a peripheral skirt portion in a form other than circular, said supporting means being mounted for complex movement whereby said skirt portion may be driven by said drive means, means to contact the inside and outside of said skirt portion adjacent said drive means and comprising an element on one side of said skirt portion and a pair of elements on the other side of said skirt portion, and track means extending from said skirt portion and adapted to engage said pair of elements in the portions of said skirt having a form other than rectilinear, whereby contact of all three elements with said skirt is maintained at all times.

5. Apparatus for processing articles comprising a fixed processing unit having a drive means, supporting means for said articles having a peripheral skirt portion in a form other than circular, said supporting means being mounted for rotation on a first axis and for swinging movement of said first axis about a second axis parallel to and spaced from said first axis whereby said skirt portion may be driven by said drive means, and means engaging said skirt portion on the inside and outside thereof at said drive means, and constraining said skirt portion to a fixed orientation of the normal thereto, at said drive means, with respect to said processing unit.

6. A machine for operating progressively along the edge of a rectangular article having at least one rounded corner, comprising a movable support for the article of the same contour as the article, means to engage and drive the support past a fixed point, an operating device located at the fixed point and engaging the edge of the article, and means to guide the support during its movement comprising a flange on the support, a single roller engaging the inside of the flange, two spaced rollers engaging the outside of the flange, and cam formations on the flange maintaining contact between all of the rollers and the flange while the rounded corner of the article is passing the operating device.

7. A machine for applying tape progressively along the edge of a rectangular article having at least one rounded corner, comprising a movable support for the article of the same contour as the article, driving means engaging the edge of the support, a tape applying means in contact with the article at the driving means, and guiding means engaging the support, said guiding means maintaining the driving means in engagement with the support and the tape applying means in contact with the article during the application of the tape to both the straight and rounded surfaces of the article.

8. A machine for applying tape progressively along the edge of a rectangular article having at least one rounded corner, comprising a movable support for the article of the same contour as the article, means to engage and drive the support past a fixed point, a tape applying means in contact with the edge of the article at the fixed point, and means to guide the support during its movement comprising a flange on the support, a single roller engaging the inside of the flange, two spaced rollers engaging the outside of the flange, and cam formations on the flange maintaining contact between all of the rollers and the flange while the rounded portion of the article is passing the tape applying means.

9. Apparatus for applying tape to the edges of flat articles comprising a fixed taping unit having a driving wheel, supporting means for said articles having a peripheral portion in a form other than circular, means mounting said support for complex movement whereby all of said periphery may successively contact said wheel to be driven thereby, and means constraining the portion of said periphery at said wheel whereby the normal to said periphery at the point of contact with said wheel has a constant orientation with respect to said taping unit.

10. Apparatus for processing articles comprising a support having a periphery other than circular, means mounting said support for rotation about a first axis, means mounting said first-mentioned means for swinging motion about a second axis, means fixed with respect to said axes and engaging said periphery in driving relation therewith, and means for maintaining a perpendicular to said periphery at the point of contact with said fixed means at a constant, predetermined orientation in space.

11. Apparatus for processing articles comprising a support having a flange with periphery other than circular, means mounting said support for rotation about a first axis, means mounting said first-mentioned means for swinging motion about a second axis, and means fixed with respect to said second axis and engaging said flange on both sides thereof, said latter means including means for moving said flange past said latter means whereby said support partakes of said rotation and said swinging motion.

12. Apparatus for processing articles comprising a support having a periphery other than circular, means mounting said support for rotation about a first axis, means mounting said first-mentioned means for swinging motion about a second axis, spaced from but parallel with said first axis, and means fixed with respect to said second axis and engaging said periphery in driving relation therewith.

13. Apparatus for processing articles comprising a support having a periphery other than circular, means mounting said support for rotation about a first axis, means mounting said first-mentioned means for swinging motion about a second axis, and means fixed with respect to said second axis and engaging said periphery in driving relation therewith.

14. In combination, a turntable having a periphery other than circular, means mounting said turntable for complex rotary movement about a plurality of parallel axes, fixed means having an element engaging the periphery of said turntable in driving relation therewith whereby to effect said rotary movement, and means adjacent said element constraining said turntable to a position wherein the normal to said periphery at said element has a constant orientation.

15. In combination, an article support having a periphery other than circular, a platform adjacent said periphery and adapted to hold elements for processing an article on said support, drive means having components on said periphery and on said platform, holding means on said platform engaging said support to hold said components in driving relation, and cam means on said support cooperating with said holding means to maintain said platform at a fixed orientation respecting the normal to said periphery at all points on said periphery, said support being mounted for rotation on a pair of spaced, parallel axes, and said platform being stationary.

16. In combination, an article support having a periphery other than circular, a platform adjacent said periphery and adapted to hold elements for processing an article on said support, drive means having components on said periphery and on said platform, holding means on said platform engaging said support to hold said components in driving relation, and cam means on said support cooperating with said holding means to maintain said platform at a fixed orientation respecting the normal to said periphery at all points on said periphery, said support being stationary, and said platform being mounted for swing about a pair of spaced, parallel axes, whereby said platform may move along the extent of said periphery.

17. In combination, an article support having a periphery other than circular, a platform adjacent said periphery and adapted to hold elements for processing an article on said support, drive means having components on said periphery and on said platform, holding means on said platform engaging said support to hold said components in driving relation, and cam means on said support cooperating with said holding means to maintain said platform at a fixed orientation respecting the normal to said periphery at all points on said periphery, said support being stationary, and said platform being mounted for swing about a pair of spaced, parallel axes, whereby said platform may move along the extent of said periphery, said drive comprising a system communicating serially from one of said axes to the other, and from said other of said axes to the drive component on said platform.

18. In combination, an article support provided with a peripheral skirt and having a periphery other than circular but with rounded corners, a platform adjacent said periphery and adapted to hold elements for processing an article on said support, drive means having components on said skirt and on said platform, holding means on said platform associated with said drive means and adapted to engage said skirt to hold said components in driving relation, and cam means on said skirt at said corners arranged to maintain the drive means in constant contact with said skirt.

References Cited in the file of this patent

UNITED STATES PATENTS

| Number | Name | Date |
|---|---|---|
| 1,078,639 | Pierce | Nov. 18, 1913 |
| 2,036,583 | Krueger | Apr. 7, 1936 |
| 2,057,060 | Schantz | Oct. 13, 1936 |
| 2,313,393 | Mitchell | Mar. 9, 1943 |
| 2,349,865 | Hawk et al. | May 20, 1944 |
| 2,469,815 | Cutright | May 10, 1949 |
| 2,549,136 | Simpson et al. | Apr. 7, 1951 |
| 2,563,542 | Mackelduff | Aug. 7, 1951 |